INVENTOR
Pierre de Vitry d'Avaucourt

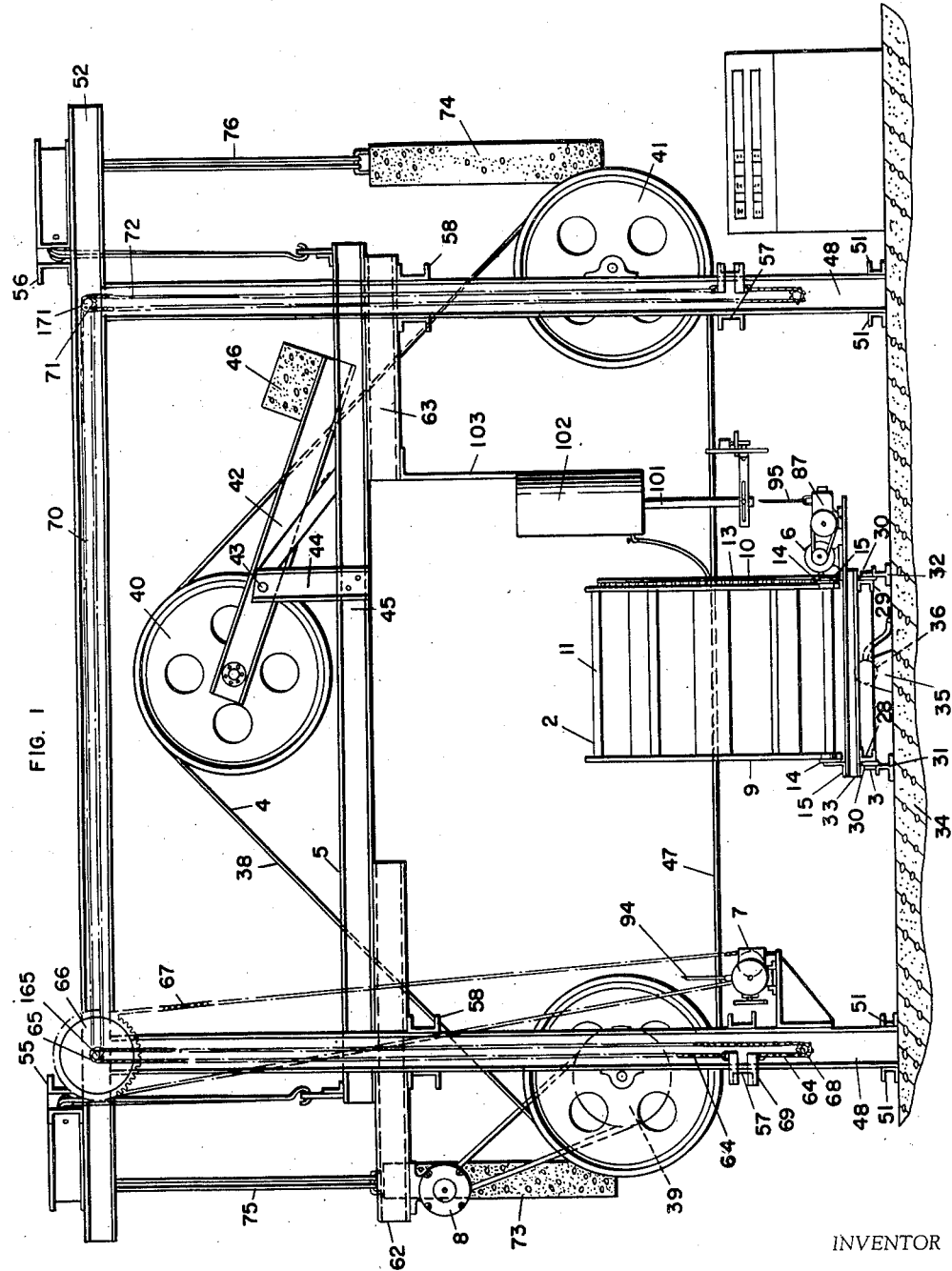

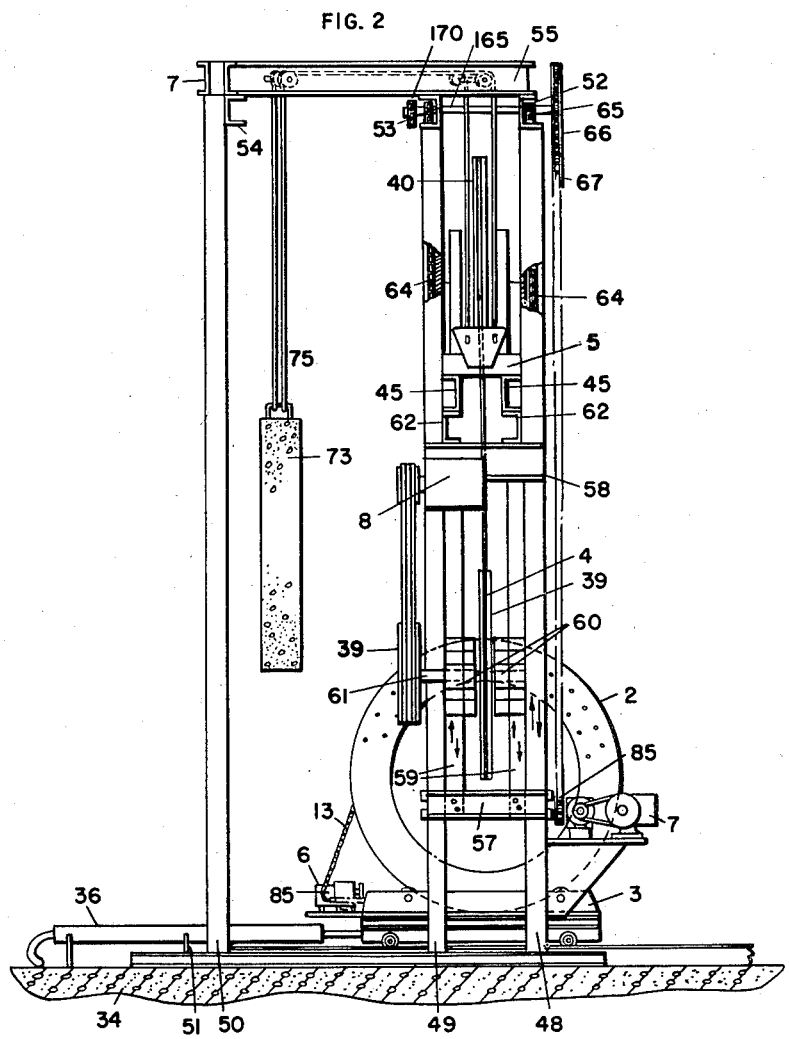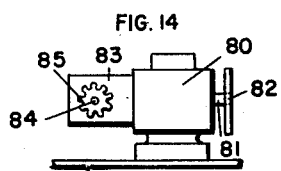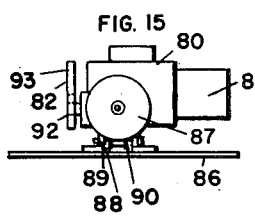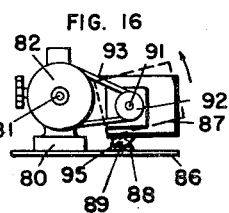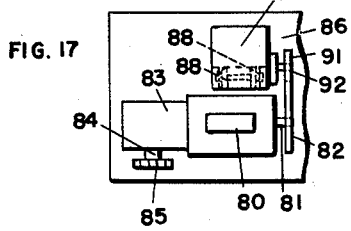

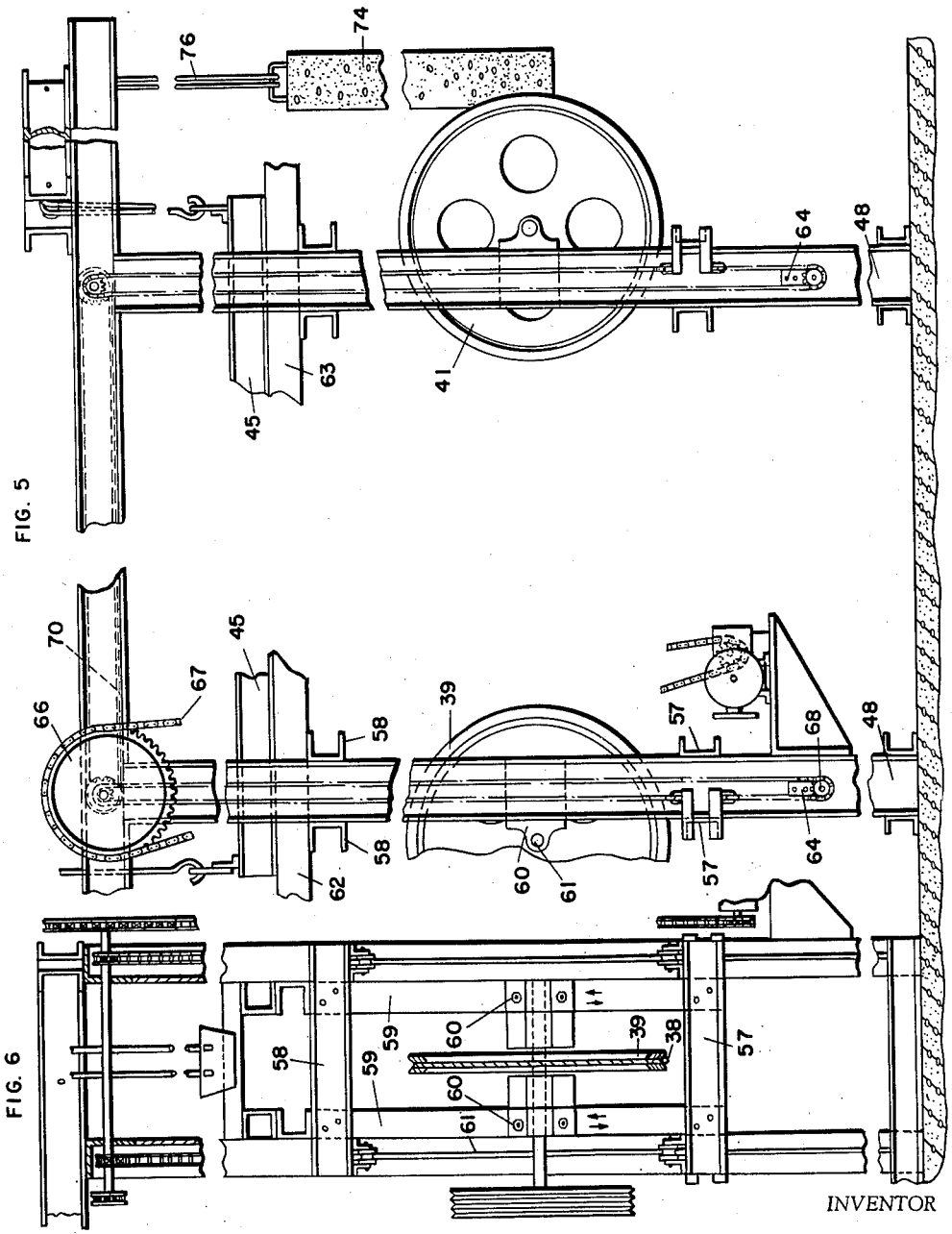

Aug. 20, 1957  PIERRE DE VITRY D'AVAUCOURT  2,803,239
PROFILE SAW

Filed Oct. 4, 1955  7 Sheets-Sheet 5

INVENTOR
Pierre de Vitry d'Avaucourt

INVENTOR
Pierre de Vitry d'Avaucourt

Aug. 20, 1957 PIERRE DE VITRY D'AVAUCOURT 2,803,239
PROFILE SAW
Filed Oct. 4, 1955 7 Sheets-Sheet 7

INVENTOR

Pierre de Vitry d'Avaucourt

United States Patent Office 2,803,239
Patented Aug. 20, 1957

2,803,239

PROFILE SAW

Pierre de Vitry d'Avaucourt, Bainbridge, Pa.

Application October 4, 1955, Serial No. 538,392

17 Claims. (Cl. 125—21)

This invention relates to a stone saw and is directed more particularly to a profile saw which will cut patterns of regular and irregular shape in stone and similar materials.

In the fabrication of copings, cornices, monuments and the like of stone, massive pieces are frequently used and severance with conventional stone saws is difficult, if not impossible, and many interesting patterns or designs cannot economically be cut from stone because of the great amount of hand work required not only in the roughing operation but also in finishing.

An object of the invention is to provide a profile saw which will require a minimum of intervention on the part of an operator to effect even complex cuts in stone and other materials even though the workpiece may be quite heavy and weigh a ton or more.

Another object of the invention is to provide a profile saw utilizing a wire sawing strand for severance and providing for horizontal and rotary movement of the workpiece to be cut and vertical motion of the saw strand and its driving mechanism, thus permitting minute and essentially universal adjustment between workpiece and saw strand during severance, making it possible to cut almost any desired design with great facility.

A further object of the invention is to provide a profile saw which will operate to sever a workpiece in accordance with a pre-determined pattern piece, the pattern piece including if desired cut-out portions disposed within the confines of the outline of the periphery of the piece to be formed, without lines of severance extending into the periphery.

An additional object of the invention is to provide a profile saw including a vertically movable saw strand elevator which carries the saw strand guiding and driving mechanism, movement of the elevator being controlled automatically by the saw strand and its position with respect to the workpiece being sawn, thus to maintain the desired "crown" on the strand for most efficient sawing.

Another object is to provide a unique speed control for wire saw elevators, carriages and the like, which will give the machine operator optional use of either of two different speeds of movement of such mechanisms by a control member which may be located remotely from the moving mechanism.

A further object is to provide a profile saw with a cylinder and piston actuated mechanism for moving the workpiece relative to the sawing wire in accordance with the position assumed by the saw strand with respect to a pattern mounted adjacent to the workpiece being operated upon.

An additional object is to provide a profile saw in which a sawing strand serves in cooperation with a pattern to control a small reciprocatory movement of the cradle or other support for the workpiece to cause the saw strand to sever the workpiece in accordance with the outlines of the pattern.

Other objects of the invention will become apparent from consideration of the following detailed description of an embodiment of the invention which will be described in conjunction with the attached drawing, in which:

Figure 1 is a front elevational view of the machine of the present invention;

Figure 2 is a side elevational view of the machine shown in Figure 1;

Figure 5 is a front elevational view, partially broken away, showing the details of portions of the wire saw elevator mechanism;

Figure 6 is a broken-away side elevational view of the elevating mechanism shown in Figure 5;

Figures 14, 15, 16 and 17 are diagrammatic views showing a compound speed reducing drive for the work cradle and the wire saw carriage;

The general arrangement

Figure 3:
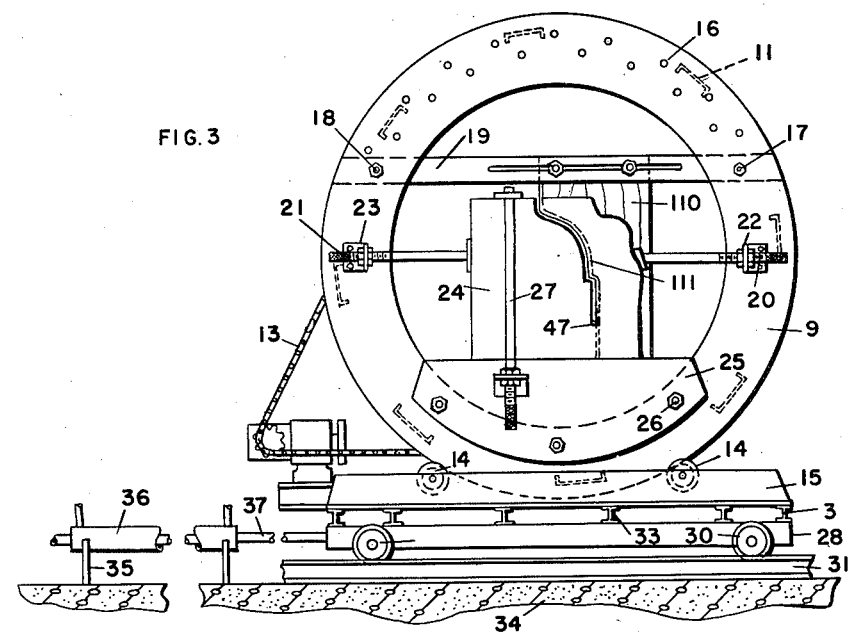
Figure 3 is a partial side elevational view of the workpiece supporting cradle and carriage shown to a larger scale than the showing of Figure 2.

The general arrangement is best illustrated in Figures 1 and 2. It includes a workpiece supporting cradle 2 of squirrel-cage configuration, rotatable about its axis and mounted on a carriage 3 for movement along a horizontal path. A wire saw 4 is provided, and it is mounted on an elevator 5 for vertical motion with respect to the workpiece supporting cradle 2. A drive 6 is provided for the cradle 2, and a similar drive 7 is provided for the elevator 5. A driving motor 8 is provided for imparting motion to the wire saw 4.

The workpiece supporting cradle

Figure 4:
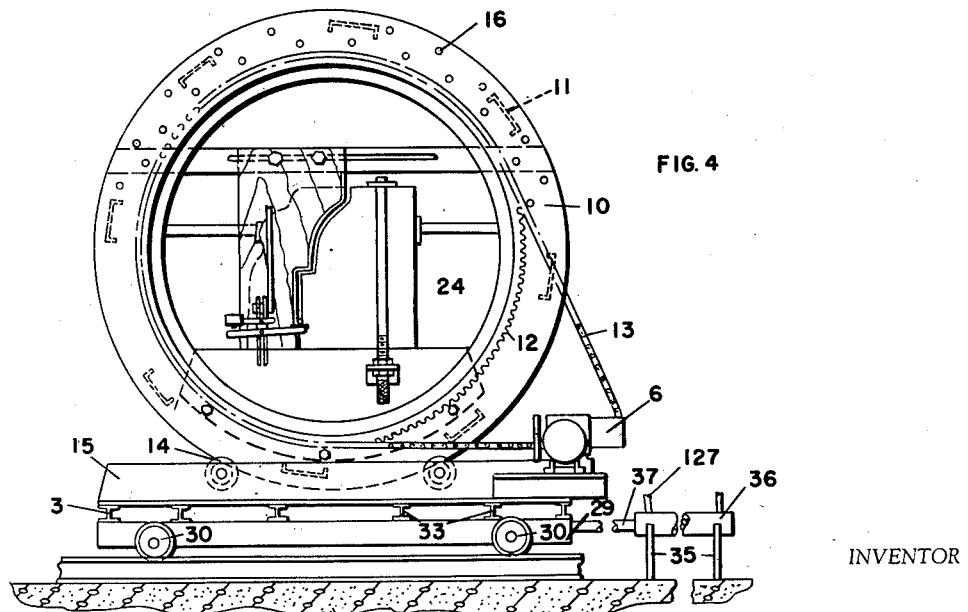
Figure 4 is a view similar to Figure 3 showing the opposite side of the workpiece supporting cradle and carriage of Figure 3.
Figure 7:
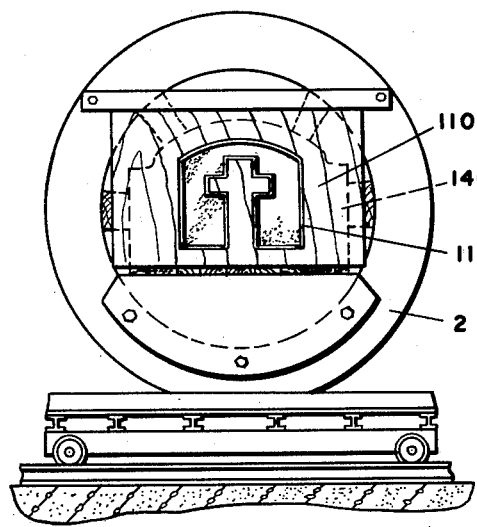
Figures 7, 8, 9 and 10 are diagrammatic views showing the various positions of the workpiece supporting cradle in the fabrication of a workpiece of stone.
Figure 8:
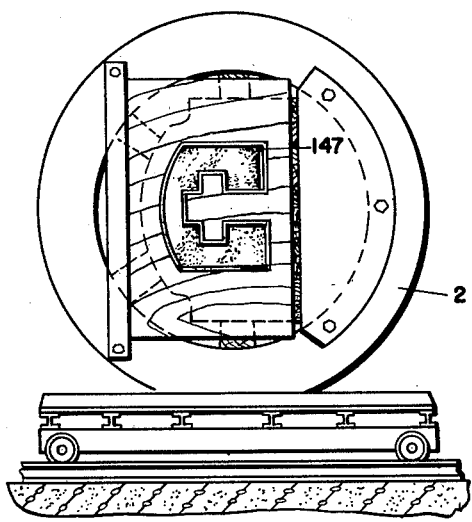
Figure 9:
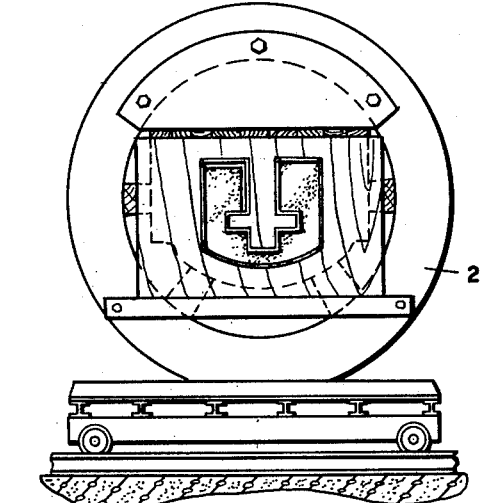
Figure 10:
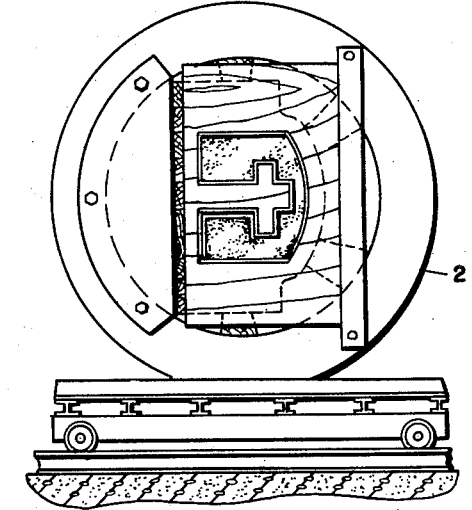

The workpiece supporting cradle is best shown in Figures 1, 3, and 4. As shown, it comprises two major end plate members 9 and 10 which are annular in plan and open in the center. Cross supporting channels 11 extend between the end plate members 9 and 10 and are bolted thereto to form the work supporting cradle into a unit of generally squirrel-cage configuration. The cross supporting channels are individually removable to facilitate loading of the machine with massive workpieces weighing in some cases a ton or more.

Mounted on the end plate member 10 and extending axially therefrom is a sprocket 12 which is shown clearly in Figure 4. A chain 13 connects the sprocket 12 with the cradle drive 6. The cradle is supported for rotation about its axis on four flanged wheels 14 mounted on angle members 15 attached to the carriage 3 as best shown in Figure 1.

The end plate members 9 and 10 are provided with a plurality of openings 16 through which may be passed fastening members such as those indicated at 17 and 18 in Figure 3 for securing a pattern support 19 in position. They also serve to receive fastenings 20 and 21 for clamp supporting members 22 and 23 which serve to hold the workpiece 24 in position on the cradle. A clamping plate 25 is also secured to the end plate member 9 by fastenings 26 and a hold-down clamp 27 which is in turn secured to the clamping plate 25. With the workpiece 24 clamped as shown in Figure 3, it is obvious that the workpiece supporting cradle 2 may be rotated about its axis on the wheels 14 without danger of the workpiece moving relative to the supporting cradle.

The cradle carriage

The cradle carriage is illustrated in Figures 1, 3 and 4. There are a pair of side channels 28 and 29 (Figure 1) to which are mounted four flanged wheels 30 upon which the carriage moves along tracks 31 and 32. Spanning the channels 28 and 29 and fastened thereto are cross supporting I-beams 33 as shown in Figures 3 and 4. To these I-beams are attached the angle members 15 which carry the flanged wheels 14 for the cradle.

Affixed to the foundation 34 by supporting members 35 is an actuating cylinder and piston unit 36 for movement of the carriage 3. A shaft 37 is attached at one end to the piston of the unit 36, and its opposite end is affixed to the carriage 3.

It will be obvious from the foregoing description that upon movement of the piston in the unit 36 horizontal motion will be imparted to the carriage 3 and the workpiece supporting cradle 2 which is mounted thereon.

The wire saw arrangement

The general arrangement of the wire saw is illustrated in Figure 1. It includes a sawing wire 38 which may be of conventional construction and may be a single helically twisted strand or may be of multiple strand formation. The sawing wire 38 is trained over sheaves 39, 40 and 41. The sheave 39 is driven and the sheaves 40 and 41 are idlers. The sheave 40 is mounted between spaced supporting arms 42 which are pivoted at 43 to channel brackets 44 which are in turn fastened to cross channels 45, the function of which will be described later. The arms 42 carry a counterweight 46 which serves to move the arms 42 about the pivot 43 and applies tension to the wire saw 38 for proper sawing. The wire saw 38 has a generally horizontal run 47 and passes in this run through the open center of the workpiece supporting cradle and into cutting relationship with the workpiece 24 carried thereby. It is obvious of course that the wire saw strand will be much longer than indicated in the drawing and will be trained over additional sheaves. As much as a thousand feet or more may be used, as is well understood by those working in the art.

The wire saw elevator

The elevator for the wire saw is mounted with respect to the main frame of the machine as shown in Figures 1, 2, 5 and 6. There are three primary vertical frame members or columns on each side of the machine. These may be in the form of channels as shown at 48, 49 and 50 in Figure 2. There will be corresponding vertical supports at the opposite side of the machine; they have been given corresponding numbers. The vertical supporting columns are secured to the base 34 by cross channels 51 which are visible in the lower portion of Figure 1. These cross channels are welded or otherwise fastened to the vertical columns and are secured to the foundation 34. The respective pairs of vertical column members 48, 49 and 50 are connected at the top by longitudinally extending channel members 52, 53 and 54 as seen in Figure 2. Transverse channel members 55 and 56 cross connect the channel members 52, 53 and 54 as seen in Figures 1 and 2.

The elevator 5 is mounted for vertical movement, with the pairs of vertical columns 48 and 49 serving as guiding ways therefor. Referring first to the left hand portion of Figure 1 and Figures 2, 5 and 6, a single side of the carriage guiding and supporting mechanism will be described.

There is a lower pair of channel members 57 which span the space between column members 48 and 49 as seen in Figure 2 and in Figure 5. There is a corresponding upper pair of channel members 58 disposed above the lower channel members 57 and these are connected by vertical channel members 59. Bearing blocks 60 for a shaft 61 for the driven sheave 39 are attached to the members 59 as shown in Figure 2.

Similar guiding members are provided on the opposite side of the machine as viewed in Figure 1, and there is a cross connecting framework which joins the two slide arrangements. This includes the main cross channels 45 previously described and stub channels 62 which project outwardly to the left in Figure 1 and support the motor drive 8, and corresponding stub channels 63 which project inwardly in the right hand portion of Figure 1 to support the sawing abrasive and cooling liquid tank and other associated equipment as will be more fully hereinafter described. These cross frame members are fastened together and are joined to the members 58 and 59 on opposite sides of the machine.

Action is imparted to the elevator mechanism which will now be described. The mechanism on opposite sides of the machine as viewed in Figure 1 is essentially the same and only one unit will be described. A chain 64 is secured to the lower channel member 57 and encircles a sprocket 65 which is keyed to a shaft 165, which carries a sprocket 66 over which is trained a chain 67 which is driven by the drive unit 7. The chain 64 is then trained over an idler sprocket 68 which rotates about a shaft affixed to the upright column 48. The other end of the chain 64 is connected to an adjusting member 69 which is also connected to the lower channel member 57. A chain 70 (top of Figure 1) connects a second sprocket 170 (Figure 2) mounted on the common shaft 165 with a sprocket which is mounted on a common shaft 71 (Figure 1) with a similar sprocket 171 which chain 72 (which corresponds to chain 64) encircles, and it is connected to the lower channel member 57 shown in the right hand portion of Figure 1. Thus, when drive unit 7 is in operation, chain 67 is driven. This imparts a uniform motion to sprockets 65 and 171 and chains 64 and 72 which are driven by these sprockets, causing the elevator to be raised or lowered uniformly, depending upon the direction of rotation of the drive unit 7.

A pair of counterweights 73 and 74 are connected to the cross channels 45 by cables 75 and 76, respectively, and counter-balance the weight of the wire saw, its elevator, and associated mechanism.

It will be clear from the foregoing that upon actuation of the drive 7 a uniform vertical motion, up or down, will be imparted to the wire saw elevator 5, depending upon the direction of rotation of the motor of drive 7.

The drives for the cradle and elevator

The drive 6 for the cradle 2, and the drive 7 for the elevator 5 are similar in construction and are shown in Figures 1, 2, 14, 15, 16 and 17.

Each unit includes a geared-head motor unit 80, the shaft 81 of which is provided with a pulley 82. The geared head 83 is provided with a right angle shaft 84 which for the unit 6 is provided with a sprocket 85 over which the chain 13 is trained as shown in Figure 2. For the unit 7 (Figure 2) the sprocket 85 drives chain 67.

The geared-head motor unit 80 is mounted on a base plate 86, and there is pivoted thereto a motor 87 which is provided with mounting brackets 88 which are disposed between angle supports 89 (Figure 16) affixed to the base plate 86. A pivot rod 90 is provided for securing the motor 87 in a pivotable condition. The driven shaft 91 of the motor 87 is provided with a pulley 92 and a belt 93 is trained over pulleys 82 and 92 and when the unit is in the position shown in Figure 16 in solid lines, the motor 87 drives the shaft 81 of geared-head motor unit 80 which is not energized, however, and this in turn drives the geared head 83 (Figure 14), and eventually the shaft 84 and sprocket 85. Thus, a very slow speed may be imparted to the sprocket 85. In some instances, it may be desirable to rotate the sprocket 85 at a much faster speed; and in order to accomplish this, the motor 87 may be tilted from the operative solid line position shown in Figure 16 to the inoperative dotted line position and the motor of geared-head motor unit 80 may be energized. Then, the sprocket 85 will be driven at the conventional speed of the geared-head motor unit 80.

As shown in Figure 1, in the left hand portion thereof, a cable 94 may be attached to the motor 87 of unit 7 and this cable may extend to a convenient position for the operator who thus can control the speed of motion of the saw elevating mechanism. A similar cable 95 may be provided on the motor 87 of unit 6 shown in the central portion of Figure 1 to the right of the cradle 2 and with this the operator may control the speed of motion imparted to the cradle by the unit 6.

The elevator control

Figure 12:
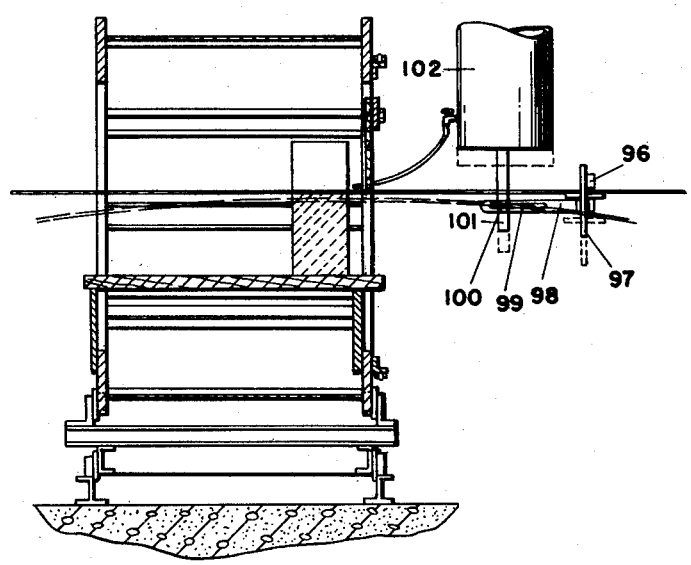
Figure 12 is a diagrammatic front elevational view showing a portion of the workpiece supporting cradle and the wire saw in operating position.
Figure 13:
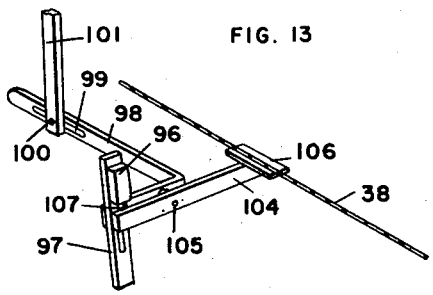
Figure 13 is a perspective view showing a portion of the wire saw crown control mechanism.

The elevator control mechanism is illustrated in Figures 1, 12 and 13. As is well known in the art of wire sawing, it is necessary to maintain a "crown" on the wire saw as it passes through the stone or other material being sawed, in order to effectuate a cut. In Figure 1 the saw is shown in a normal position without a workpiece mounted in the carriage 2; whereas, in Figure 12 a "crown" has been shown in the wire and this has been exaggerated slightly for purposes of illustration. The "crown" controlling device, which operates through control of the actuation of the motor drive unit 7 for the saw elevator, includes a microswitch 96 (Figure 13) which is mounted upon an arm 97. The arm 97 is in turn secured to a horizontal arm 98 which is provided with a slot 99 which receives a fastening 100 which passes therethrough, and it is received within a vertical arm 101. The arm 101 is attached in a similar manner to the elevator mechanism so as to move therewith. In the embodiment shown in Figures 1, 12 and 13 the arm 101 is attached to the abrasive and water supply tank 102 which is in turn connected to the stub-channels 63 by bracket member 103 (Figure 1).

Figure 20:
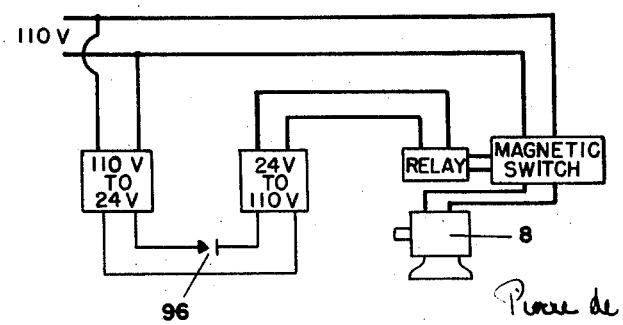
Figure 20 is a wiring diagram in schematic form with appropriate notations for the wire saw elevator.

An actuator 104 is pivoted to the arm 98 at 105 and carries a shoe 106 which lies in the path of travel of the wire 38. When the actuator 104 is pivoted about the pivot 105 it comes into engagement with the projecting control member 107 of the microswitch 96. The microswitch 96 controls the drive unit 7 in a manner which will be clear from an examination of Figure 20.

As the wire saw 38 tends to sever the workpiece, the wire 38 moves toward the shoe 106. As this downward motion continues, the actuator 104 pivots about the point 105, and when the actuator 104 engages the control member 107 of the microswitch 96, a circuit is completed for the drive unit 7 for the elevator 5 and the elevator lowers the wire saw mechanism. This downward motion continues until the control mechanism which is mounted on the carriage and moves with it is brought out of engagement with the wire 38, the wire 38 remaining essentially in position because it is in engagement with the workpiece which of course does not move with the carriage. As soon as the shoe 106 of actuator 104 is moved out of engagement with the wire 38, control member 107 of the microswitch 96 is actuated to break the circuit and the downward motion of the wire saw carriage is stopped. The wire saw continues to sever during this entire moving operation and as soon as the workpiece has been severed for an adequate distance to bring the saw wire 38 again into engagement with the shoe 106 to actuate the member 104, the operation is repeated. This continues until the workpiece has been severed for the desired distance as indicated by the pattern. This will be described more fully in connection with Figures 7 to 11 and in connection with a description of the operation of the device.

The carriage control arrangement

Control of the carriage 3 is effected through a cylinder and piston arrangement 36. Control of the piston 36 is effected through a 4-way magnetic valve 108 (Figures 18 and 19) which is controlled by a relay 109. The relay may be built into the valve as in a valve manufactured by A. Schrader's Son, Division of Scovill Manufacturing Company, Brooklyn, New York, and known as a four-way valve. Relay 109 of magnetic valve 108 is controlled by the pattern 110 which is mounted on the pattern support 19 and is best shown in Figures 3 and 4. The pattern 110 is made of non-conductive material, such as hardwood, micarta, or the like, and has a facing of conducting material 111 such as a strip of metal such as steel, copper, brass, or the like, securely fastened thereto. The pattern is shaped to correspond with the outline to be cut in the workpiece 24. In the embodiment shown in Figures 3, 4 the workpiece is in the form of a cornice member having a generally curved configuration.

Figure 18:
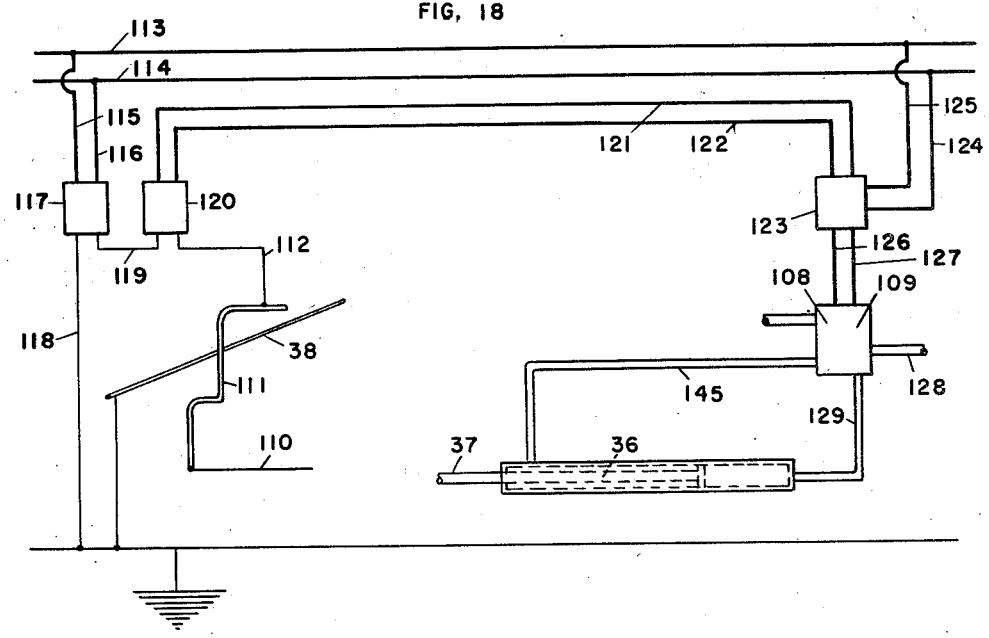
Figure 18 is a schematic wiring diagram showing the electrical control circuits and a cylinder and piston arrangement for the workpiece cradle carriage.

Referring to Figure 18, the conducting facing 111 of the pattern 110 is connected by wire 112 to one side of a transformer to be more fully described later. The wire saw stand 38 is connected to ground as diagrammatically shown in Figure 19. Actually, the entire machine is grounded and obviously the wire saw strand 38 will be grounded since the connecting parts are all of metal.

In order to impart current to the magnetic valve 108, the circuits shown in Figure 18 may be provided. There is a source of 110 volts alternating current, for instance, which is fed to wires 113 and 114. Leads 115 and 116 extend from the source of current to a 110 volt to 24 volt step-down transformer 117. A lead 118 connects to ground and another lead 119 extends from the 24 volt side of the transformer 117 to the 24 volt side of a 24 volt to 110 volt step-up transformer 120. The circuit for the 24 volt side of this transformer is completed through lead 112 previously mentioned, which is connected to ground through the wire saw strand 38 when the strand lies in engagement with the facing 111 of the pattern 110. When this occurs, current is supplied to the transformer 120 and 110 volt alternating current is delivered through leads 121 and 122 to a control relay 123 which is effective for controlling the supply of 110 volt alternating current from the source through leads 124 and 125 and leads 126 and 127 to the solenoid 109 of magnetic valve 108.

From this it will be clear that there is little danger of the workmen being injured through high voltage electricity applied to the machine through the pattern, for the whole machine is at ground potential and all pattern control circuits operate at 24 volts.

When the solenoid 109 is actuated, the valve 108 supplies actuating fluid to the unit 36. Fluid under pressure from line 128 flows through valve line 129 to the unit 36 to move the piston and piston rod 37 in a direction to traverse the carriage 3 to the right as viewed in Figure 4. The kerf made in the workpiece by the sawing wire is slightly wider than the diameter of the sawing wire and this permits the workpiece to be moved slightly relative to the sawing wire 38. As this occurs, the pattern and the pattern facing 111 are brought out of engagement with the wire 38 and the circuit for relay 123 is broken since it depends for energization upon contact of the wire 38 with the facing 111 as seen in Figure 18.

Figure 19:
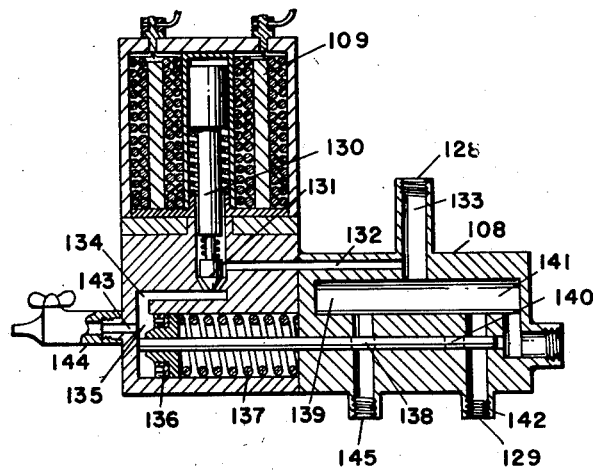
Figure 19 is a diagrammatic layout of a four-way hydraulic control valve for the carriage.

A typical magnetic control valve 108 is shown in Figure 19. It includes solenoid coil 109 which actuates a plunger 130 to which is connected a valve 131 in the supply line 132.

Fluid for operation of the unit is supplied under pressure from line 128 (Figure 18) through an inlet 133 (Figure 19) and when the solenoid 109 is energized and the valve 131 is free to move upwardly, fluid flows from the inlet 133 through the line 132 and a passage 134 to a cylinder 135 in which operates a piston 136. When fluid is applied to the head of the piston 136, it is moved to the right as viewed in Figure 19 compressing a return spring 137. When the piston 136 moves to the right, a port 138 in the piston rod 139 which carries the piston 136 is closed and a corresponding port 140 is opened, permitting hydraulic fluid to flow from the inlet 133 through a passage 141, through port 140 and into a port 142 into which is connected line 129 to the hydraulic control cylinder 36 (Figure 18). When fluid passes through the port 142 and supply line 129 to the cylinder 36, the piston rod 37 is moved to the right as viewed in Figure 4 and the wire 38 is brought out of engagement with the pattern contact 111. Thereupon the circuit for the solenoid 109 is deenergized and the valve 131 returns to its normally closed position. The spring 137 then moves the piston 136 to the position shown in Figure 19, fluid being bled through a passage 143, controlled by a manual adjustable bleeder valve 144. By controlling the amount of fluid bled through the valve 144, the speed of return of the piston to its normal position is controlled.

When the piston returns to the position shown in Figure 19, the port 138 is opened and fluid then flows from the inlet 133 through a supply line 145 which connects with the cylinder 36 and moves the carriage 3 to the left as viewed in Figure 4, bringing the wire 38 toward the pattern and the pattern contact 111.

Since the valve 108 is preferably a four-way valve, when fluid is delivered through two of the valves, the other pair are in position to effect return of the fluid into the system. This is conventional with four-way valve structures.

It will be clear from the foregoing that this is a hunting type of operation with the carriage reciprocating slowly a very slight distance to the right and to the left as viewed in Figure 4, first to move the carriage to bring the wire into contact with the pattern contact 111 and then to move the carriage to bring the saw slightly away from the pattern contact 111.

*Operation of the saw*

Figure 11:
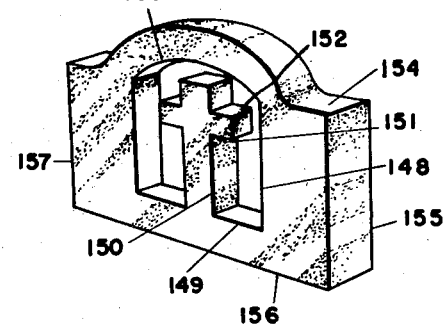
Figure 11 is an isometric view showing the completed workpiece after severance has been completed.

The operation of the profile saw will be clear from the foregoing description. Figures 7 to 10, however, illustrate some of the various positions assumed by a workpiece 146 fastened to the cradle 2 in the fabrication of a monument as shown in Figure 11. The pattern 110 with its conductive contact surface 111 is mounted on the cradle 2 and the workpiece is also positioned firmly on the cradle in the manner previously described. At the start of the operation of sawing the interior portion of the monument defining a cross as shown in Figure 11, a hole 147 is drilled through the workpiece 146 in the position shown in Figure 8 at about the point of intersection of lines 148 and 149, as shown in Figure 11. The carriage 2 is then rotated to the position shown in Figure 8 and the sawing wire 38 which has been severed is passed through the drilled opening 147 and is brazed, welded or spliced together. The elevator 5 is then properly positioned and counter-weight 46 (Figure 1) applies tension to the wire 38, drawing it taut, ready for sawing.

Sawing is then effected downwardly in a vertical direction with the sawing wire 38 being properly fed with abrasive and water from tank 102. The carriage 3 is slowly moved horizontally in its hunting motion previously described; and, as the sawing continues, the elevator control unit is actuated periodically to move the elevator 5 for the sawing wire downwardly. This action continues until the sawing wire reaches the point where lines 149 and 150 intersect (Figure 11). Thereupon, the operator energizes the drive 6 for the cradle 2, and rotates the same to the position shown in Figure 9. Thereupon, the sawing is continued in a downwardly direction, along the line 150, in the same manner as along the line 149 previously described, until a cut has been made to the point of intersection of lines 150 and 151. Then the cradle 2 will be rotated to the position shown in Figure 10 and sawing will be continued to the point of intersection of lines 151 and 152. After each point of intersection is reached, the cradle 2 will be rotated to provide that the sawing wire will be cutting essentially in a downwardly vertical direction.

During severance along curved line 153, the cradle 2 will be periodically moved slightly as the cut progresses to insure that the sawing wire will be working as nearly vertically downwardly as possible at all times.

After the interior lines of the monument have been severed, the wire saw strand will be cut or unspliced and removed from within the workpiece and then joined together again by brazing, welding or splicing in a position remote from the workpiece.

A second pattern may then be used to control the severance of the outside surfaces 154, 155, 156 and 157 of the monument, in the same manner as severance of the inner portions was effected, as described above.

Suitable wedging and supporting of the workpiece and removal of fully severed portions will have to be effected as cutting proceeds, to avoid pinching of the sawing wire and fouling of the control mechanism. In some instances it may be necessary, after sawing of certain portions of a workpiece, to reposition it in the carriage 2 and reclamp it into place. This will depend, of course, upon the shape of the workpiece and the desired contour to be imparted to the finished piece.

With the device of the present invention, it is possible to accurately sever granite, marble, sandstone and other materials. If care is exercised in severance, it will not be necessary with some stones to further finish the cut surface—an adequately smooth true cut being made by the wire saw. Configurations of relatively intricate design may be cut with good speed and accuracy and at low cost since hand labor will be at a minimum.

I claim:

1. In a profile saw, a sawing wire, a plurality of sheaves over which said sawing wire is trained for movement in a closed path with a substantially horizontal run, means for driving one of said sheaves to impart motion to said sawing wire, an elevator upon which said sheaves and driving means are mounted for substantially vertical motion, a rotatable work supporting cradle, means for rotating said cradle about its axis to bring a workpiece mounted on said cradle into proper sawing relationship with respect to said sawing wire, means for lowering said elevator to crown said sawing wire in engagement with said workpiece for proper cutting of said workpiece, a carriage upon which said cradle is mounted for rotation, and means controlled by said sawing wire for imparting a substantially horizontal motion to said carriage to adjust the position of said workpiece with respect to said sawing wire for sawing a desired profile in said workpiece.

2. In a profile saw, a rotatable work supporting cradle; means for clamping a workpiece to said cradle for movement therewith; a carriage upon which said cradle is mounted for rotation; a sawing wire unit including a sawing wire, a plurality of sheaves over which said sawing wire is trained for movement in a closed path with a substantially horizontal run intersecting a workpiece clamped to said cradle, and means for driving said sawing wire; an elevator upon which said sawing wire unit is mounted for substantially vertical motion; and means for causing said wire saw to sever said workpiece to a desired profile comprising means responsive to the crown of said sawing wire for vertically lowering said elevator periodically to adjust the crown of said sawing wire in engagement with said workpiece for proper cutting of said workpiece and means for periodically reciprocating said carriage horizontally in accordance with the profile to be severed in said workpiece.

3. In a profile saw, a rotatable work supporting cradle; means for clamping a workpiece to said cradle for movement therewith; a pattern; means for securing said pattern to said cradle adjacent to said workpiece; a carriage upon which said cradle is mounted for rotation; a sawing wire unit including a sawing wire trained for movement in a closed path with a substantially horizontal run intersecting a workpiece clamped on said cradle, and means for driving said sawing wire; means for lowering said sawing wire along a substantially vertical direction in its substantially horizontal run as said workpiece is severed; and means for guiding said workpiece with respect to said sawing wire to cause a desired profile to be cut into said workpiece in accordance with said pattern comprising means for rotating said cradle and means for moving said carriage along a substantially horizontal path.

4. In a profile saw, the combination of a wire sawing unit including a sawing wire trained for movement in a closed path with a substantially horizontal run and movable generally vertically downwardly as sawing through a workpiece progresses; a work supporting cradle, means for clamping a workpiece to said cradle for movement therewith, a carriage upon which said cradle is mounted; and means for moving said carriage along a substantially horizontal path in accordance with the desired profile to be severed in said workpiece comprising a fluid pressure cylinder and piston unit secured to said carriage and effective for imparting motion thereto upon movement of said piston with respect to said cylinder, a valve for controlling the flow of fluid to said cylinder and piston unit, and means controlled by said sawing wire, for actuating said valve.

5. In a profile saw, the combination of a wire sawing unit including a sawing wire trained for movement in a closed path with a substantially horizontal run; means for progressing said sawing wire in said run generally vertically downwardly as sawing through a workpiece progresses; a carriage upon which a workpiece to be sawn is mounted; and means for moving said carriage along a substantially horizontal path in accordance with the desired profile to be severed in said workpiece comprising a pattern element secured to said carriage and movable with said carriage and the workpiece, said pattern element having a profile corresponding to a profile to be severed in said workpiece, a fluid pressure cylinder and piston unit secured to said carriage to impart motion thereto upon movement of said piston with respect to said cylinder, a valve for controlling the flow of fluid to said cylinder and piston unit to actuate the same, and means controlled by engagement of said sawing wire and said pattern element for actuating said valve.

6. In a profile saw, the combination of claim 5 in which the valve is electrically actuated and in which the control means for the valve includes an electrical circuit completed through contact of said sawing wire with said pattern element, effective for moving said carriage in a direction to disengage said sawing wire and pattern.

7. In a profile saw, the combination of claim 6 in which the valve is actuated by a solenoid and is provided with biasing means normally urging said valve to a position where fluid will be supplied to said piston and cylinder unit to move said carriage in a direction to bring said sawing wire into engagement with said pattern element, and in which actuation of said solenoid upon completion of its electrical circuit through contact of said sawing wire and said pattern effects a reversal of the direction of movement of said carriage.

8. In a profile saw, the combination of claim 7 in which the valve is provided with a bleeder opening which limits the speed of movement of said valve induced by said biasing means.

9. In a profile saw, the combination of a wire sawing unit including a sawing wire trained for movement in a closed path with a substantially horizontal run; an elevator upon which said sawing unit is mounted for movement in a generally vertical path; means for driving said elevator; a work supporting cradle rotatable about a horizontal axis; and means for controlling the crown of said sawing wire as it moves through said workpiece as sawing proceeds, comprising means responsive to the position of said sawing wire for actuating said elevator driving means to lower the elevator periodically to move said wire in its substantially horizontal run downwardly while in engagement with said workpiece to increase the crown imparted to the wire.

10. In a profile saw, the combination of a wire sawing unit including a sawing wire trained for movement in a closed path with a substantially horizontal run; an elevator upon which said sawing unit is mounted for movement in a generally vertical path; means for driving said elevator; a work supporting cradle; means for controlling the crown of said sawing wire as it moves through said workpiece as sawing proceeds, comprising means controlled by the position assumed by said sawing wire in its substantially horizontal run adjacent to said workpiece for actuating said elevator driving means to lower said elevator and increase the crown imparted to said workpiece.

11. In a profile saw, the combination of a wire sawing unit including a sawing wire trained for movement in a closed path with a substantially horizontal run; an elevator upon which said sawing unit is mounted for movement in a generally vertical path; means for driving said elevator; a work supporting cradle; means for controlling the crown of said sawing wire as it moves through said workpiece as sawing proceeds, comprising an elevator control member carried by said elevator and engageable with said sawing wire when said sawing wire has cut its way partially through said workpiece and its crown has been reduced, and means actuated by said control member upon such engagement by said sawing wire to initiate said elevator driving means to lower said elevator and increase said crown, moving said control member away from said sawing wire.

12. In a profile saw, the combination of claim 11 in which said elevator driving means is rendered inactive upon disengagement of said sawing wire from said elevator control member.

13. In a profile saw, the combination of a wire sawing unit including a sawing wire trained for movement in a closed path with a substantially horizontal run; an elevator upon which said sawing unit is mounted for movement in a generally vertical direction, an electric motor for driving said elevator; a work supporting cradle; and means for controlling the crown of said sawing wire as it moves through said workpiece as sawing proceeds comprising an electrical switch for actuating said elevator motor, means fixing said switch for movement with said elevator, an actuator for said switch carried by said elevator, a shoe on said actuator disposed to intersect the sawing wire as it cuts through the workpiece on the cradle, and an electrical circuit for said elevator motor completed upon actuation of said switch to effect lowering said elevator.

14. In a profile saw, the combination of a wire sawing unit including a sawing wire trained for movement in a closed path with a substantially horizontal run, a carriage upon which a workpiece to be sawn is mounted, means for moving said carriage along a substantially horizontal path in accordance with the desired profile to be severed in said workpiece, an elevator upon which said sawing unit is mounted for movement in a generally vertical path to maintain a desired crown on the sawing wire as sawing proceeds; means for driving said elevator; and means responsive to the position of said sawing wire for automatically controlling horizontal movement of said carriage and vertical movement of said elevator.

15. In a profile saw, the combination of a wire sawing unit including a sawing wire trained for movement in a closed path with a substantially horizontal run, a cradle upon which a workpiece may be clamped for sawing, a carriage upon which the cradle is mounted for rotation, means for moving said carriage along a substantially horizontal path, a pattern secured to the cradle adjacent to the workpiece, said pattern having a profile corresponding to the profile to be sawn in the workpiece, means for moving said carriage along a substantially horizontal path controlled by engagement of said sawing wire with said pattern and means for periodically automatically vertically lowering said sawing wire in its substantially horizontal run as said sawing wire cuts through said workpiece and is moved horizontally in accordance with the profile of said pattern.

16. In a profile saw, the combination of claim 15 in which the wire sawing unit is mounted on an elevator which is movable downwardly in a substantially vertical direction by an electric motor and in which a switch is provided for controlling said motor, and in which there is an actuator for said switch carried by said elevator and disposed for engagement by said sawing wire to actuate said switch to cause said elevator to be lowered and said actuator to be moved away from said sawing wire.

17. In a profile saw, a sawing wire, means for moving said sawing wire in a closed path, a rotatable work supporting cradle, an elevator upon which said sawing wire is mounted, means for imparting substantially vertical motion to said elevator to crown said sawing wire in engagement with a workpiece carried by said cradle for proper cutting of said workpiece, a carriage upon which said rotatable cradle is mounted, means mounted on said carriage for rotating said cradle about its axis to bring said workpiece carried thereby into proper sawing relationship with respect to said sawing wire for performing a substantially vertical cut in said workpiece by said sawing wire, and means for imparting a substantially horizontal motion to said carriage and to the rotatable cradle mounted thereon to adjust the horizontal position to said workpiece with respect to said sawing wire for sawing a desired profile in said workpiece.

References Cited in the file of this patent

UNITED STATES PATENTS

| | | |
|---|---|---|
| 21,622 | Norman et al. | Sept. 28, 1858 |
| 311,741 | Gay | Feb. 3, 1885 |
| 497,400 | Barclay | May 16, 1893 |
| 594,542 | Enoble | Nov. 30, 1897 |
| 774,018 | Wust-Kunz | Nov. 1, 1904 |
| 1,622,908 | Whiting | Apr. 9, 1912 |
| 1,743,057 | Wernholz et al. | Jan. 7, 1930 |
| 2,134,743 | Strawn | Nov. 1, 1938 |
| 2,398,346 | Anderson | Apr. 16, 1946 |
| 2,666,863 | Davis et al. | Jan. 19, 1954 |

FOREIGN PATENTS

| | | |
|---|---|---|
| 6,569 | France | Jan. 7, 1907 |
| 1,089,014 | France | Mar. 14, 1955 |